US012652262B2

(12) United States Patent
Kamal et al.

(10) Patent No.: US 12,652,262 B2
(45) Date of Patent: Jun. 9, 2026

(54) DYNAMIC ALLOCATION OF MESSAGING RESOURCES IN SOFTWARE AS A SERVICE MESSAGING PLATFORM

(71) Applicant: Twilio Inc., San Francisco, CA (US)

(72) Inventors: Shayra Kamal, New York, NY (US);
Eliot Flannery, Seattle, WA (US);
Peter Janovsky, Pleasanton, CA (US);
Sergio Leottau, Cartagena (CO); Jaime Soto, Doral, FL (US)

(73) Assignee: Twilio Inc., San Francisco, CA (US)

( * ) Notice: Subject to any disclaimer, the term of this patent is extended or adjusted under 35 U.S.C. 154(b) by 190 days.

(21) Appl. No.: 18/528,403

(22) Filed: Dec. 4, 2023

(65) Prior Publication Data

US 2025/0184300 A1     Jun. 5, 2025

(51) Int. Cl.
*G06F 15/16*          (2006.01)
*H04L 51/214*        (2022.01)
(52) U.S. Cl.
CPC .................................. *H04L 51/214* (2022.05)
(58) Field of Classification Search
CPC ...................................................... H04L 51/214

(Continued)

(56) References Cited

U.S. PATENT DOCUMENTS 7,969,884 B1 * 6/2011 Venables ................. H04L 47/60
370/235
10,091,122 B2 * 10/2018 Dumitrescu ............ H04L 47/50

(Continued)

FOREIGN PATENT DOCUMENTS

EP          3671480 A1      6/2020

OTHER PUBLICATIONS

Cisco. "QOS Hierarchical Queueing Framework". pp. 1-16. Sep. 2015. (Year: 2015).*

(Continued)

*Primary Examiner* — Imad Hussain
(74) *Attorney, Agent, or Firm* — Lowenstein Sandler LLP

(57)          ABSTRACT

An example method of dynamic allocation of messaging resources in a software as a service (SaaS) messaging platform includes: generating a hierarchical data structure comprising a plurality of levels, wherein a first level of the plurality of levels comprises a first plurality of nodes, each node of the first plurality of nodes associated with a respective sub-account of a specified parent account of the messaging platform, and wherein a second level of the plurality of levels comprises a second plurality of nodes, each node of the second plurality of nodes associated with a respective level of service supported by the messaging platform; traversing the hierarchical data structure, by identifying, for each node of the hierarchical data structure, a respective plurality of child nodes; allocating, to each node of the plurality of child nodes, a respective share of a messaging resource quota associated with its parent node; associating, with each terminal node of a plurality of terminal nodes of the hierarchical data structure, a respective message queue of a plurality of message queues; allocating, to each message queue of the plurality of message queues, a respective messaging resource quota associated with a corresponding terminal node; receiving, from a user associated with a specified sub-account, a request to forward, to a specified destination, a message associated with a specified level of service; identifying, among the plurality of message queues, a message queue associated with the specified level of service and the specified sub-account; and queuing the message into the identified message queue.

20 Claims, 9 Drawing Sheets

(58) Field of Classification Search
USPC .......................................................... 709/206
See application file for complete search history.

(56)                        References Cited

U.S. PATENT DOCUMENTS

2015/0149631 A1\*   5/2015  Lissack ............... H04L 41/5051
                                                     709/226
2020/0409763 A1\*  12/2020  Bischel ................. G06F 9/4881
2024/0007427 A1\*   1/2024  Janovsky ............. H04L 47/626

OTHER PUBLICATIONS

Aiyagari S., et al., "AMQP Advanced Message Queuing Protocol Protocol Specification," A General Purpose Middleware Standard, Dec. 2006, Version 0-9, pp. 1-69.
Anonymous., "QoS: Hierarchical Queueing Frameworkd Configuration Guide, Cisco IOS Release 15M&T," Cisco Systems Inc, Jan. 2013, 32 Pages.
International Search Report and Written Opinion for International Application No. PCT/US2024/058297, mailed Mar. 6, 2025, 33 Pages.

\* cited by examiner

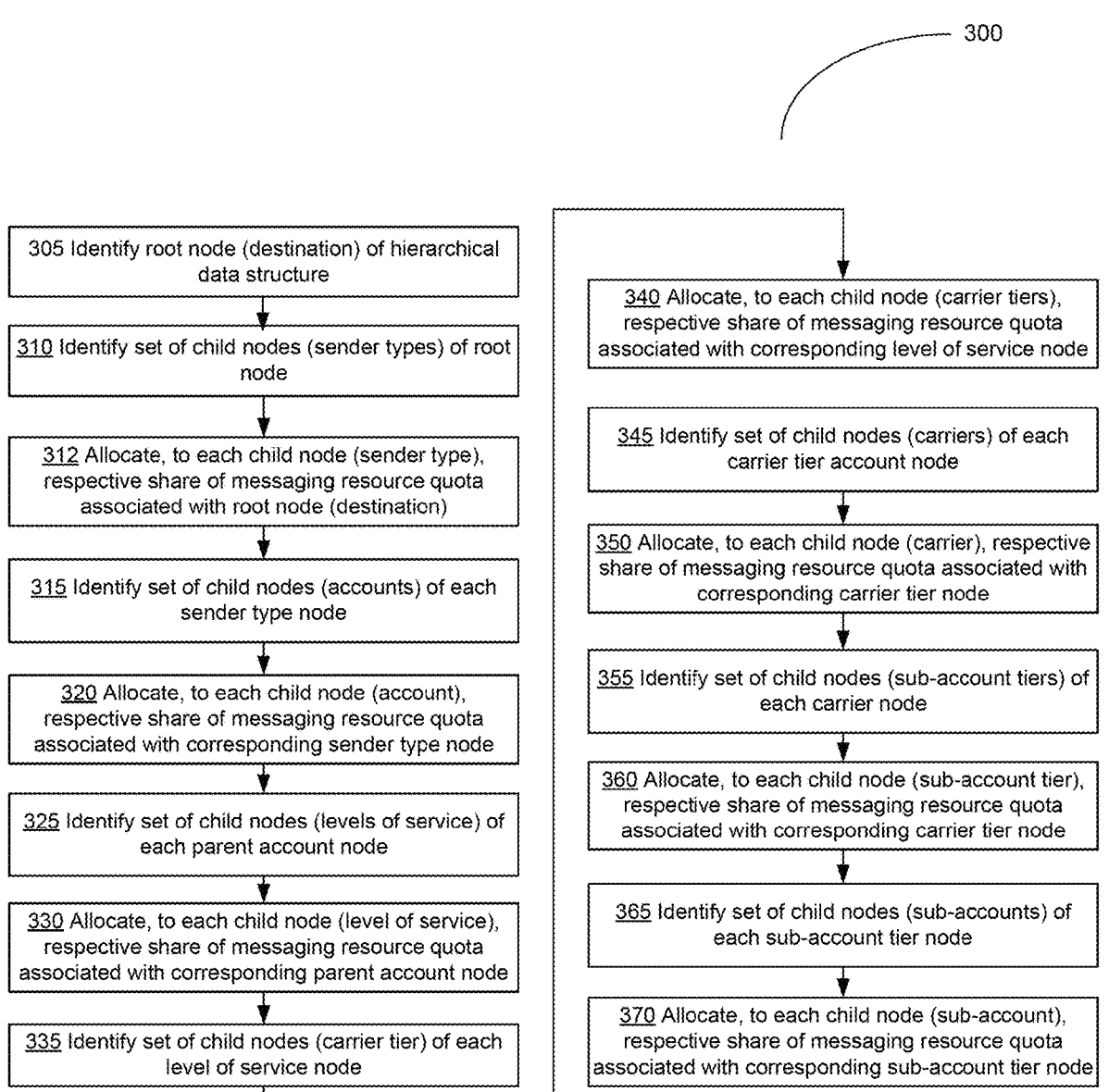

305 Identify root node (destination) of hierarchical data structure

310 Identify set of child nodes (sender types) of root node

312 Allocate, to each child node (sender type), respective share of messaging resource quota associated with root node (destination)

315 Identify set of child nodes (accounts) of each sender type node

320 Allocate, to each child node (account), respective share of messaging resource quota associated with corresponding sender type node 325 Identify set of child nodes (levels of service) of each parent account node 330 Allocate, to each child node (level of service), respective share of messaging resource quota associated with corresponding parent account node 335 Identify set of child nodes (carrier tier) of each level of service node 340 Allocate, to each child node (carrier tiers), respective share of messaging resource quota associated with corresponding level of service node 345 Identify set of child nodes (carriers) of each carrier tier account node 350 Allocate, to each child node (carrier), respective share of messaging resource quota associated with corresponding carrier tier node 355 Identify set of child nodes (sub-account tiers) of each carrier node 360 Allocate, to each child node (sub-account tier), respective share of messaging resource quota associated with corresponding carrier tier node 365 Identify set of child nodes (sub-accounts) of each sub-account tier node 370 Allocate, to each child node (sub-account), respective share of messaging resource quota associated with corresponding sub-account tier node

FIG. 3

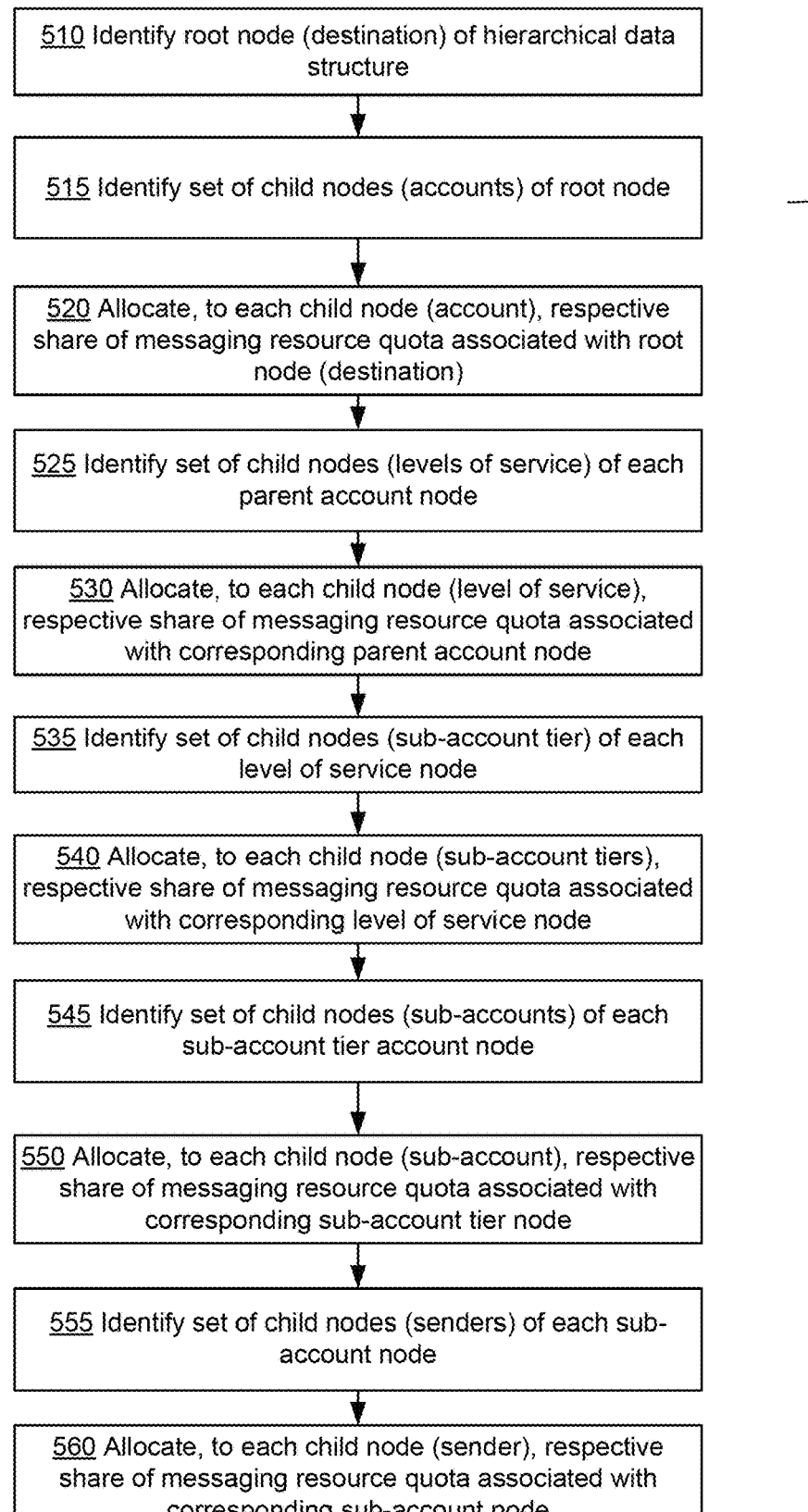

500

510 Identify root node (destination) of hierarchical data structure

515 Identify set of child nodes (accounts) of root node

520 Allocate, to each child node (account), respective share of messaging resource quota associated with root node (destination)

525 Identify set of child nodes (levels of service) of each parent account node

530 Allocate, to each child node (level of service), respective share of messaging resource quota associated with corresponding parent account node 535 Identify set of child nodes (sub-account tier) of each level of service node 540 Allocate, to each child node (sub-account tiers), respective share of messaging resource quota associated with corresponding level of service node 545 Identify set of child nodes (sub-accounts) of each sub-account tier account node 550 Allocate, to each child node (sub-account), respective share of messaging resource quota associated with corresponding sub-account tier node 555 Identify set of child nodes (senders) of each sub-account node 560 Allocate, to each child node (sender), respective share of messaging resource quota associated with corresponding sub-account node

610 Receive message forwarding request

620 Generate queue id
from request parameters

630
Performance metric value satisfies
threshold criterion?

640 Insert message into queue
identified by queue id

650 Error

700

710 Identify group of queues associating
with respective nodes sharing common parent node 720 Retrieve, from each queue of identified group of
queues, a respective number of messages based on its
share of messaging resource quota of parent node 730 Forward retrieved messages to one or more carriers

DYNAMIC ALLOCATION OF MESSAGING RESOURCES IN SOFTWARE AS A SERVICE MESSAGING PLATFORM

TECHNICAL FIELD

Aspects and implementations of the disclosure relate to computer networking, and more specifically, to systems and methods for dynamic allocation of messaging resources in a software as a service (SaaS) messaging platform.

BACKGROUND

Instant messaging (IM) technology may include a type of online chat allowing real-time transmission of media content over the Internet or another computer network. Messages are typically transmitted between two or more parties, when each user inputs content and triggers a transmission to the recipient(s), who may be all connected on a common network or common application. Short Messaging Service (SMS) technology may include text messaging. An SMS message is often sent from one mobile device to another over the cellular network. Multimedia Messaging Service (MMS) technology may include a way to send messages that include multimedia content to and from a device, such as a mobile phone, over a cellular network.

BRIEF DESCRIPTION OF THE DRAWINGS

Aspects and implementations of the disclosure will be understood more fully from the detailed description given below and from the accompanying drawings of various aspects and implementations of the disclosure, which, however, should not be taken to limit the disclosure to the specific aspects or implementations, but are for explanation and understanding.

FIG. 3 is a flow diagram of an example method of dynamic allocation of messaging resources based on example hierarchical data structure of FIG. 2, in accordance with aspects of the present disclosure;

FIG. 5 is a flow diagram of an example method of dynamic allocation of messaging resources based on example hierarchical data structure of FIG. 4, in accordance with aspects of the present disclosure;

DETAILED DESCRIPTION

Figure 1:
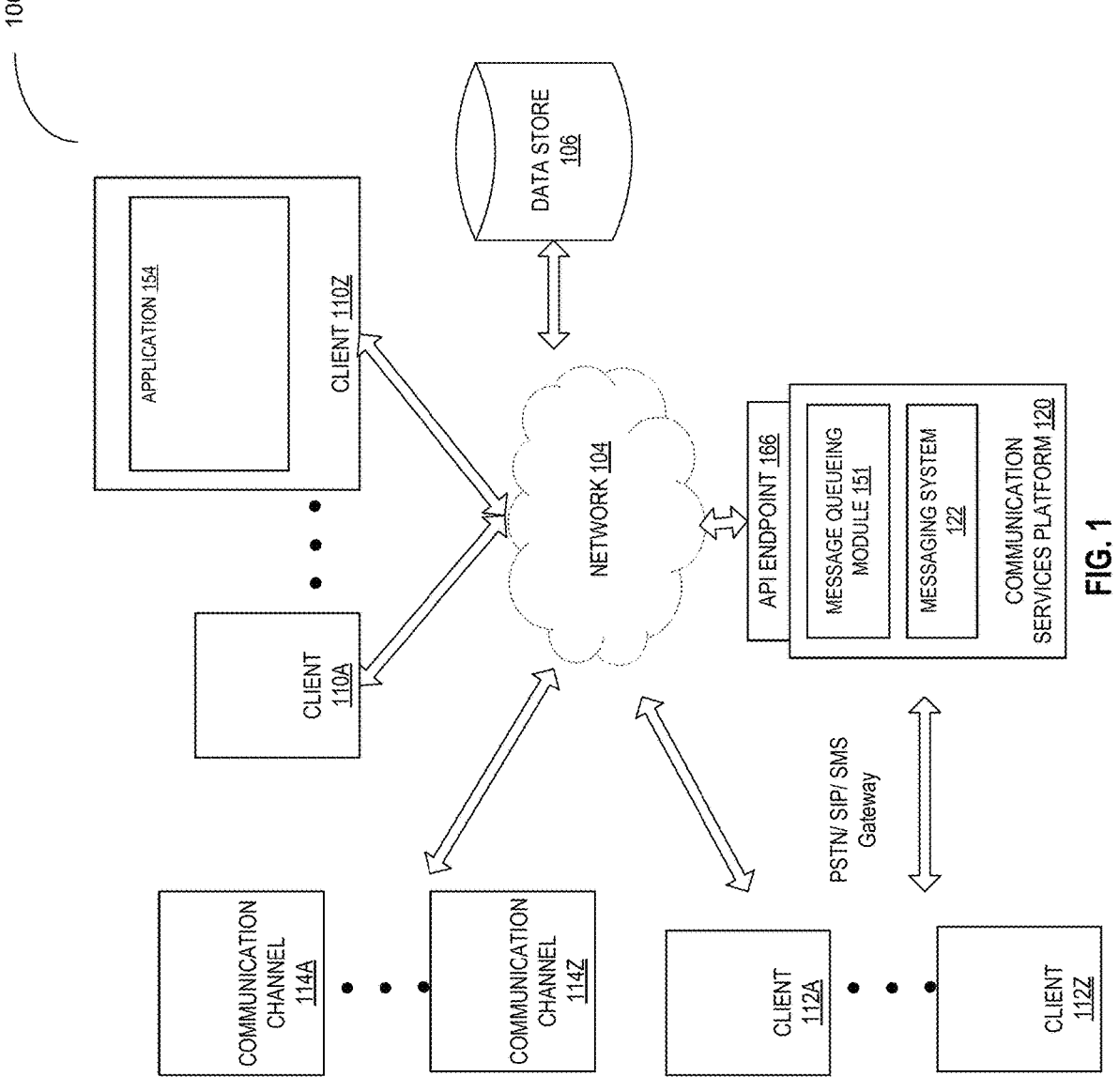
FIG. 1 illustrates an example system architecture of a communication services platform, in accordance with some implementations of the disclosure.

Various organizations have increasingly adopted messaging as a valuable tool for communications within and outside of the organization. In an example use case, an organization may use messaging to forward to its end-users one-time passwords for a two-factor authentication scheme. In another example use case, an organization may use messaging to send promotional messages to its customers. In another example use case, an organization may use messaging to send appointment reminders to its customers and may further request the message receiver to reply to either confirm or cancel an appointment.

In various use cases, organizations may employ communication platforms for various messaging services. In an illustrative example, a communication platform, such as a Software as a Service (SaaS) platform, may facilitate sending of messages, such as SMS messages, MMS messages, and/or IM messages, to recipient devices via various communication channels. "Communication channel" refers to a medium that uses one or more of a particular protocol, a particular underlying technology or is provided by a particular entity (e.g., third-party entity). Accordingly, a SAAS platform may utilize various communication channels relying upon one or more communication protocols through which messages may be forwarded to recipient devices. For example, the SaaS platform may use one or more hosted and/or ported telephone numbers to send text messages (e.g., SMS messages) to recipient devices using one or more SMS communication channels, such as telecommunications carrier networks. In another example, the SaaS platform may send instant messages to recipient devices using one or more IM communication channels. Examples of communication channels include mobile network-based channels such as SMS or MMS, Internet Protocol (IP)-based channels, voicemail, and proprietary channels (e.g., social media messaging applications).

In some implementations, multiple organizations, represented by their respective accounts, may use a single messaging platform for forwarding their outgoing messages. Furthermore, each organization represented by a corresponding account may provide messaging services to its clients (e.g., represented by their respective sub-accounts of the parent account associated with the organization); each of the sub-accounts may, in turn, utilize the messaging services to communicate to its end users. Thus, multiple sub-accounts within an organization, as well as multiple organizations served by a messaging platform, may compete for one or more messaging resources, and such competition may potentially lead to a "noisy neighbor" effect at the account and/or sub-account level. The "noisy neighbor" effect may occur when an account (or sub-account) uses a large portion of an available messaging resource and thus causes other accounts (or sub-accounts) to suffer performance issues. In an illustrative example, a messaging resource may be represented by the bandwidth of a communication channel, which results in a certain throughput, i.e., the number of messages forwarded via the communication channel within a unit of time. However, the systems and methods described herein may be utilized for allocating various other messaging resources (e.g., the memory allocated for storing outgoing message queues, the processing capacity allocated for servicing outgoing message queues, etc.).

Moreover, users of each sub-account may generate outgoing messages in furtherance of various use cases, e.g., one-time passwords, promotional messages, conversational messages (e.g., responses to end user-originated messages), etc. While for some use cases, the latency of message delivery may bear no importance (e.g., for promotional messages), for other use cases the message delivery latency may be critical (e.g., for one-time passwords). In some implementations, a level of service may be associated with each message to reflect the use case of the message, the message priority, and/or other parameters of the message. Accordingly, a contested messaging resource (e.g., the bandwidth of a communication channel, which results in a certain throughput) may need to be allocated in a manner that would take into account the levels of service associated with messages being routed.

Aspects of the disclosure address the above-mentioned and other challenges by maintaining multiple message queues that facilitate a desired distribution of the available messaging resources (e.g., messaging bandwidth or messaging rate) at each of one or more hierarchical levels. In an illustrative example, the messaging rate associated with a given sender type (e.g., toll-free phone number, short phone number, or long phone number) may be distributed (e.g., evenly or based on the assigned weights) at each of one or more hierarchical levels (e.g., corresponding to the parent account, the level of service, the carrier tier, the carrier, the sub-account tier, and the sub-account). "Messaging rate" refers to the number of messages forwarded within a specified unit of time (e.g., per second). "Sub-account tier" refers to a group of sub-accounts that share one or more characteristics related to, e.g., their messaging volumes, message delivery parameters, fault tolerance, etc. "Carrier tier" herein refers to a group of messaging carriers that share one or more characteristics related to e.g., message delivery parameters, fault tolerance, etc.

In another illustrative example, the messaging rate associated with a given destination (e.g., identified by the Mobile Country Code (MCC) and/or Mobile Network Code (MNC)) may be distributed (e.g., evenly or based on the assigned weights) at each of one or more hierarchical levels (e.g., corresponding to the parent account, the level of service, the sub-account tier, the sub-account, and the sender).

In some implementations, a messaging platform may generate a hierarchical data structure having respective levels corresponding to parent accounts and their respective sub-accounts, levels of service, carriers, and/or other entities or parameter values affecting the desired messaging resource distribution. At each level of the hierarchical data structure, a corresponding messaging resource distribution method (e.g., even distribution or weighted distribution) may be implemented, which may be independent of the messaging resource distribution methods implemented at other levels of the hierarchical data structure.

Figure 2:
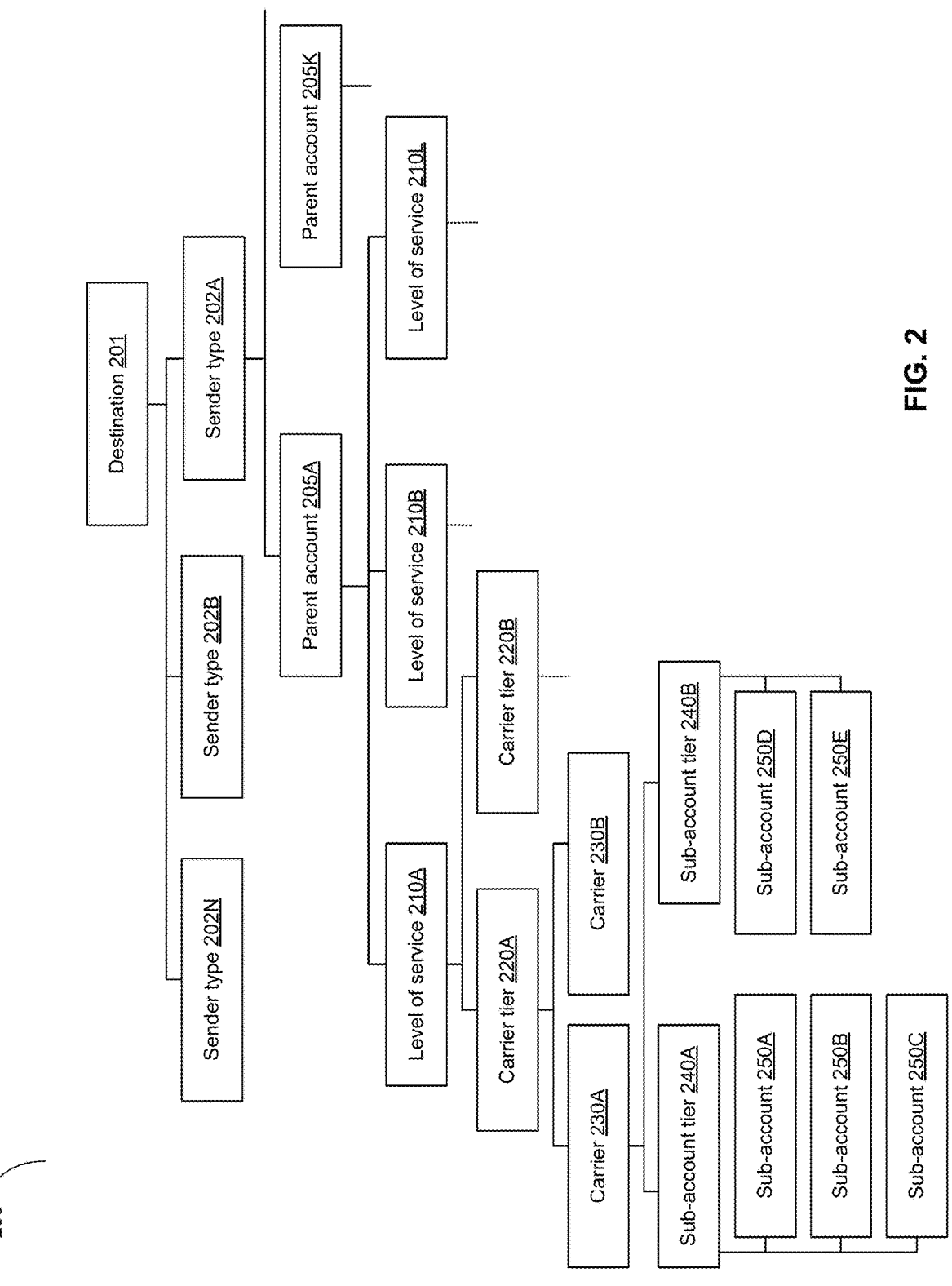
FIG. 2 schematically illustrates an example hierarchical data structure maintained by communication services platform for determining a desired distribution of messaging resources among multiple message queues, in accordance with aspects of the present disclosure.

In an illustrative example, the root node of the hierarchical data structure may correspond to a specified destination (e.g., identified by the MCC and/or MNC); the child nodes of the root node may correspond to specified sender types (e.g., toll-free phone number, short phone number, or long phone number); the child nodes of each sender type node may correspond to respective parent accounts of the messaging platform; the child nodes of each parent account node may correspond to respective levels of service; the child nodes of each level of service node may correspond to respective carrier tiers; the child nodes of each carrier tier node may correspond to respective carriers; the child nodes of the carrier nodes may correspond to respective sub-account tiers; and the child nodes of each sub-account node may correspond to respective sub-accounts, as described in more detail herein below with reference to FIG. 2.

Accordingly, the messaging platform may allocate, to each parent account node, a respective share of the messaging resource quota (e.g., the messaging rate) associated with the sender type represented by the root node of the hierarchical data structure. The messaging platform may further allocate, to each level of service node, a respective share of the messaging resource associated with the corresponding parent account node. The messaging platform may further allocate, to each carrier tier node, a respective share of the messaging resource associated with the corresponding level of service node. The messaging platform may further allocate, to each carrier node, a respective share of the messaging resource associated with the corresponding carrier tier node. The messaging platform may further allocate, to each sub-account tier node, a respective share of the messaging resource associated with the corresponding carrier node. The messaging platform may further allocate, to each sub-account node, a respective share of the messaging resource associated with the corresponding sub-account tier node. In some implementations, the allocation of messaging resources may allow certain overcommitment of the messaging resource, such that the amount of messaging resource allocated to all terminal nodes of the hierarchical data structure may exceed, by a predefined overcommitment ratio, the amount of available messaging resource. In other implementations, no overcommitment of the messaging resource may be allowed, such that the amount of messaging resource allocated to all terminal nodes of the hierarchical data structure may be less than or equal to the amount of available messaging resource.

At each level of the hierarchical data structure, a corresponding messaging resource distribution method (e.g., even distribution or weighted distribution) may be implemented, which may be independent of the messaging resource distribution methods implemented at other levels of the hierarchical data structure.

In another illustrative example, the root node of the hierarchical data structure may correspond to a specified destination (e.g., identified by the MCC and/or MNC); the child nodes of the root node may correspond to respective parent accounts of the messaging platform; the child nodes of each parent account node may correspond to respective levels of service; the child nodes of each level of service node may correspond to respective sub-account tiers; the child nodes of each sub-account tier node may correspond to respective sub-accounts; and the child nodes of each sub-account node may correspond to respective senders (e.g., identified by respective phone numbers), as described in more detail herein below.

Accordingly, the messaging platform may allocate, to each parent account node, a respective share of the messaging resource quota (e.g., the messaging rate) associated with the destination network associated with the root node of the hierarchical data structure. The messaging platform may further allocate, to each level of service node, a respective share of the messaging resource associated with the corresponding parent account node. The messaging platform may further allocate, to each sub-account tier node, a respective share of the messaging resource associated with the corresponding level of service node. The messaging platform may further allocate, to each sub-account node, a respective share of the messaging resource associated with the corresponding sub-account tier node. The messaging platform may further allocate, to each sender node, a respective share of the messaging resource associated with the corresponding sub-account node.

At each level of the hierarchical data structure, a corresponding messaging resource distribution method (e.g., even distribution or weighted distribution) may be implemented, which may be independent of the messaging resource distribution methods implemented at other levels of the hierarchical data structure.

In other illustrative examples, various other hierarchical data structures may be employed by the messaging platform for distributing messaging resources among multiple users of a messaging platform.

In some implementations, the hierarchical data structure and/or allocated messaging resource quotas may be dynamically regenerated (e.g., periodically or in response to updating the distribution rules or in response to adding or removing one or more entities corresponding to respective nodes of the hierarchical data structures).

The messaging platform may maintain, for every terminal node (i.e., every node of the lowest level) of the hierarchical data structure, a corresponding message queue, which may be identified by the path from the root node to the terminal node associated with the message queue. Responsive to receiving a request to forward a message, the messaging platform may insert the message into a queue identified by the message parameters, e.g., the destination, the sender type, the sender, the originating sub-account and its parent account, and/or the level of service.

The messages may be retrieved from the message queues and forwarded to the respective carriers by one or more message dequeuing processing threads, which may be scheduled asynchronously with respect to the message enqueuing processing threads. The message dequeuing processing threads may retrieve, from each queue of a group of queues associated with a respective group of nodes sharing a common parent node of the hierarchical data structure (e.g., sub-accounts of a given sub-account tier for a specified carrier, level of service, parent account and sender type), a respective number of messages that is proportional to its share of the messaging resource quota of the common parent node. The retrieved messages may be forwarded to respective carriers that would deliver the messages to their respective destinations, as described in more detail herein below.

Accordingly, the present disclosure addresses the technical problem of providing a desired dynamic distribution of messaging resources between multiple users of a SaaS messaging platform while taking into account various level of service reflecting respective use cases.

A technical solution to the above-identified technical problem may involve distributing the available messaging resources (e.g., the messaging rate) by dynamically generating a hierarchical data structure having respective levels corresponding to accounts, sub-accounts, levels of service, and/or other entities or parameter values affecting the desired messaging resource distribution. Starting from the topmost level of the hierarchical data structure, each node of a given level of the hierarchical data structure may then be allocated a respective share of the messaging resource quota (e.g., the messaging rate) associated with the parent node, and the allocation process may proceed down the hierarchical data structure until all terminal nodes receive their respective allocations. Each terminal node may be associated with a respective queue, which may be identified by the path from the root node to the terminal node. Responsive to receiving a request to forward a message, the message may be inserted into a queue corresponding to the message parameters, e.g., the destination, sender, originating sub-account, and level of service. The messages may be retrieved from the message queues and forwarded to the respective carriers by one or more message dequeuing processing threads, which may be scheduled asynchronously with respect to the message enqueuing processing threads.

Thus, the technical effect may include providing a desired distribution of the messaging resources among multiple users of a messaging platform, as described in more detail herein below.

Various aspects of the methods and systems are described herein by way of examples, rather than by way of limitation. The systems and methods described herein may be implemented by hardware (e.g., general purpose and/or specialized processing devices, and/or other devices and associated circuitry), software (e.g., instructions executable by a processing device), or a combination thereof.

FIG. 1 illustrates an example system architecture 100, in accordance with some implementations of the disclosure. The system architecture 100 (also referred to as "system" herein) includes a communication services platform 120, a data store 106, client devices 110A-110Z connected to a network 104, client devices 112A-112Z communicatively coupled to communication services platform 120, and communication channels 114A-114Z coupled to the network 104 (or otherwise communicatively coupled to other elements of the system 100).

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 106 is a persistent storage that is capable of storing data as well as data structures to tag, organize, and index the data. Data store 106 may be hosted by one or more storage devices, such as main memory, magnetic or optical storage based disks, tapes or hard drives, NAS, SAN, and so forth. In some implementations, data store 106 may be a network-attached file server, while in other implementations data store 106 may be some other type of persistent storage such as an object-oriented database, a relational database, and so forth, that may be hosted by communication services platform 120 or one or more different machines coupled to the communication services platform 120 via the network 104.

The client devices 110A-110Z (generally referred to as "client device(s) 110" herein) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some implementations, client devices 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some implementations, client devices 110A through 110Z may also be referred to as "user devices."

In some implementations, a client device, such as client device 110Z, may implement or include one or more applications, such as application 154 (also referred to as "client application 154" herein) executed at client device 110Z. In some implementations, application 154 may be used to communicate (e.g., send and receive information) with communication services platform 120. In some implementations, application 154 may implement user interfaces (e.g., graphical user interfaces (GUIs)) that may be webpages rendered by a web browser and displayed on the client device 110Z in a web browser window. In another implementation, the user interfaces of client application 154 may be included in a stand-alone application downloaded to the client device 110Z and natively running on the client device 110Z (also referred to as a "native application" or "native client application" herein).

In some implementations, client devices 110 may communicate with communication services platform 120 using one or more function calls, such as application programming interface (API) function calls (also referred to as "API calls" herein). For example, the one or more function calls may be identified in a request using one or more application layer protocols, such a HyperText Transfer Protocol (HTTP) (or HTTP secure (HTTPS)), and that are sent to the communication services platform 120 from the client device 110Z implementing application 154. In some implementations, the communication services platform 120 may respond to the requests from the client device 110Z by using one or more API responses using an application layer protocol. Similarly, communication services platform 120 may communicate with one or more communication channels 114A-114Z using API function calls.

In some implementations, one or more of client devices 110 may be identified by respective uniform resource identifiers (URIs), such as a uniform resource locator (URL). For example, communication services platform 120 may send an API call to client device 110Z addressed to a URL specific to the client device 110Z. In some implementations, the communication services platform 120 may be identified by a URI. For instance, the API call sent by a client device 110 to communication services platform 120 may be directed to the URL of communication services platform 120.

In some implementations, client devices 112A-112Z (generally referred to as "client device(s) 112" herein) may be similar to client devices 110. In some implementations, client devices 112 may include one or more telephony devices. A telephony device may include a Public Switched Telephone Network (PSTN)—connected device, such as a landline phone, cellular phone, or satellite phone, for example. In some implementations, a telephony device may also include an internet addressable voice device (e.g., non-PSTN telephony device), such as Voice-Over-Internet-Protocol (VOIP) phones, or Session Initiation Protocol (SIP) devices, for example. In some implementations, a telephony device may include one or more messaging devices, such as a Short Message Service (SMS) network device that, for example, uses a cellular service to exchange SMS messages or Multimedia Messaging Service (MMS) messages.

In some implementations, the communication services platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, communication services platform 120 may include a plurality of computing devices that together may comprise a hosted computing resource, a grid computing resource or any other distributed computing arrangement. In some implementations, communication services platform 120 may correspond to an elastic computing resource where the allotted capacity of processing, network, storage, or other computing-related resources may vary over time.

In some implementations, communication services platform 120 provides one or more API endpoints 166 that may expose services, functionality or content of the communication services platform 120 to one or more of client devices 110 or communication channels 114A-114Z. In some implementations, an API endpoint may be one end of a communication channel, where the other end may be another system, such as a client device 110Z or communication channel 114Z. In some implementations, the API endpoint may include or be accessed using a resource locator, such a universal resource locator (URL), of a server or service. The API endpoint may receive requests from other systems, and in some cases, return a response with information responsive to the request. In some implementations, HTTP or HTTPS methods may be used to communicate to and from API endpoint 166.

In some implementations, the API endpoint 166 (also referred to as a "messaging request interface" herein) may function as a computer interface through which communication requests, such as message requests, are received and/or created. The communication services platform 120 may include one or more types of API endpoints.

In some implementations, the API endpoint 166 may include a messaging API whereby external entities or systems may send a communication to create message content and/or request sending of a message. The API may be used in programmatically creating message content and/or requesting sending of one or more messages. In some implementations, the API is implemented in connection with a communication service wherein users (e.g., authenticated entities) associated with sub-accounts of respective accounts may submit independent requests. These requests made through the API may be managed with consideration of other requests made within an account and/or across multiple accounts on the communication service.

In some implementations, the API of the API endpoint 166 may be used in initiating general messaging or communication requests. For example, a messaging request may indicate one or more destinations (e.g., specified by endpoint identifiers such as recipient phone numbers), message content (e.g., text and/or media content), and possibly an origin endpoint identifier (e.g., a sender phone number to be associated with outgoing SMS messages).

In some implementations, the API of the API endpoint 166 may be any suitable type of API such as a REST (Representational State Transfer) API, a GraphQL API, a SOAP (Simple Object Access Protocol) API, and/or any suitable type of API. In some implementations, the communication services platform 120 may expose through the API, a set of API resources which when addressed may be used for requesting different actions, inspecting state or data, and/or otherwise interacting with the communication platform.

In some implementations, a REST API and/or another type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the communication services platform 120 may observe the principles of a RESTful design or the protocol of the type of API. RESTful is understood in this document to describe a Representational State Transfer architecture. The RESTful HTTP requests may be stateless, thus each message communicated contains all necessary information for processing the request and generating a response. The API service may include various resources, which act as endpoints that may specify requested information or requesting particular actions. The resources may be expressed as URI's or resource paths. The RESTful API resources may additionally be responsive to different types of HTTP methods such as GET, PUT, POST and/or DELETE.

In some implementations, the API endpoint 166 may include a message request instruction module that may be called within an application, script, or other computer instruction execution. For example, a computing platform may support the execution of a set of program instructions where at least one instruction within a script or other application logic is used in specifying a message request and communicating that request.

In some implementations, the API endpoint 166 may include a console, administrator interface, or other suitable type of user interface. Such a user-facing interface may be a graphical user interface. Such a user interface may additionally work in connection with a programmatic interface In some implementations, the message request may include a data object characterizing the properties of a message. In some implementations, the communication services platform 120 is associated with message requests that are programmatically initiated (e.g., an application-to-person (A2P) message). In some implementations, the message request could be one initiated from an inbound received message.

In some implementations, the message request may include one or more of one or more destinations, one or more origin endpoints, and message content. In some implementations, one or more of these properties may be specified indirectly such as through system or account configuration. For example, all messages may be automatically assigned an origin endpoint that is associated with an account. In some implementations, the message content may include any suitable type of media content including, text, audio, image data, video data, multimedia, interactive media, data, and/or any suitable type of message content.

In an illustrative example, used for illustration rather than limitation, communication services platform 120 may include a Software as a Service (SaaS) platform that may at least in part provide one or more services, such as communication services, to one or more clients. The SaaS platform may deploy services, such as software applications, to one or more clients for use as an on-demand service. For example, the SaaS platform may deliver and/or license software applications on a subscription basis while also hosting, at least in part, the software application. The licensed software applications can, at least in part, be hosted on the infrastructure, such as the cloud computing resources of the SaaS platform.

In some implementations, communication services platform 120, as noted above, may provide communication services that include, but are not limited to, voice services, messaging services (e.g., SMS services or MMS services), email services, video services, chat messaging services (e.g., internet-based chat messaging services), or a combination thereof. Communication operations using the communication services may use one or more of a communication network (e.g., Internet), telecommunications network (e.g., such as a cellular network, satellite communication network, or landline communication network), or a combination thereof, to transfer communication data between parties.

In some implementations, the messaging system 122 may function to interface with one or more communication network(s) and/or service(s) for facilitating SMS, MMS, and/or chat messaging). In some implementations, the messaging system 122 may include an interface to one or more carrier-based communication routes used in sending SMS, MMS, and/or other carrier-based messages. There may be multiple carrier-based communication routes that serve as different optional "routes" when sending communications over a carrier-based network (e.g., a mobile network). The messaging system 122 may additionally or alternatively include an interface to one or more over-the-top (OTT) communication channels which may be offered by a third-party messaging platform (e.g., proprietary social media messaging, messaging applications, etc.).

A route may refer to a communication delivery path, defined by a series of one or more of computers, routers, gateways and/or carrier networks through which the communication is transferred from a source computer to a destination computer (e.g., through which the transmission of a message occurs). For example, the same route may be used to transfer messages using different communication channels, and the same communication channel may be used to transfer messages using different routes. In some example implementations, different channels correspond to different applications on a receiving device. For example, a smart phone may have one application to handle SMS messages, another application to handle email, and a third application to handle voicemail. Alternatively, some applications may handle multiple communication channels. For example, one application may handle both SMS and MMS messages.

In some implementations, when the messaging system 122 elects to send a message using a carrier-based channel, the message is communicated to an appropriate carrier connection for routing to the destination (e.g., a destination network or endpoint). Carrier-based channels may use SMPP (Short Message Peer-to-Peer protocol) for communicating to an aggregator or another suitable gateway such that the SMS/MMS message is transferred over a carrier network. Once transmitted to the carrier network, the message may be relayed appropriately to arrive at the intended destination. A message in transit may have multiple routing segments that are used in the delivery to an end destination device.

For example, the messaging system 122 may include an interface to one or more SMS Gateways that enable a computer to send and receive SMS text messages to and from a SMS capable device over the global telecommunications network (normally to a mobile phone). The SMS Gateway translates the message sent and makes it compatible for delivery over the network to be able to reach the recipient. The different SMS gateways (or more generally message gateways) may serve as different route options when the messaging system 122 is determining a channel and/or route to be used for one or more message transmissions.

In some implementations, SMS Gateways may route SMS text messages to the telco networks via an SMPP interface that networks expose, either directly or via an aggregator that sells messages to multiple networks. SMPP, or Short Message Peer-to-Peer, is a protocol for exchanging SMS messages between Short Message Service Centers (SMSCs) and/or External Short Messaging Entities (ESMEs).

In some implementations, the destination of a message may be used in determining the candidate message routes (and/or channels). For example, a phone number of a destination endpoint or another identifier associated with the intended recipient of the message may be used to identify the destination network associated with the intended recipient. For example, a destination network may be identified by an MCC/MNC pair.

In some implementations, communication services platform 120 includes a messaging system 122 that may use the phone number associated with the intended recipient of the message to lookup the MCC/MCN pair identifying the destination network. For example, the messaging system 122 may determine the MCC/MNC pair using an MCC/MNC directory that lists the MCC/MNC pair corresponding to each phone number. In some implementations, the MCC/MNC directory may be stored in a routing provider storage. Alternatively, the MCC/MNC directory may be stored at some other network accessible location. In either case, the messaging system 122 may use the phone number associated with the intended recipient of the message to query the MCC/MNC directory and identify the MCC/MNC pair that identify the corresponding destination network.

In some implementations, the messaging system 122 may use the MCC/MNC pair retrieved from the MCC/MNC directory to identify candidate routing providers and routes that are available to deliver a message to the destination network identified by MCC/MNC pair. For example, the routing provider storage may include a routing provider directory that lists each MCC/MNC pair serviced by the messaging system 122 and the corresponding routing providers and routes available for use with each MCC/MNC pair. Accordingly, the routing provider directory may list the routing providers and routes that are available to the messaging system 122 to deliver messages to the destination network identified by each MCC/MNC pair listed in the routing provider directory.

In some implementations, communication services platform 120 may support multiple accounts, each account representing, e.g., an organization registered with the communication services platform 120. "Organization" herein refers to any entity that may include one or more hierarchical levels, such that one or more organizational units may be associated with each of the hierarchical levels. One or more end users (e.g., members or employees) may be associated with the account. In some implementations, an account may be associated with multiple sub-accounts, each sub-account being associated with one or more end users. For example, an organization may be a legal entity (e.g., a corporation). "User" herein may refer to an individual, an entity controlled by multiple individuals, and/or an automated software and/or hardware module.

In general, functions described as being performed by the communication services platform 120 may also be performed on the client devices 110A through 110Z (and vice versa), if appropriate. In addition, the functionality attributed to a particular component may be performed by different or multiple components operating together. The communication services platform 120 may also be accessed as a service provided to other systems or devices through appropriate APIs.

The multitenancy mode of operation of the communication services platform 120 may involve multiple instances of one or multiple software applications operating in a shared computing environment. Thus, the application instances (i.e., employed by respective sub-accounts) may be logically isolated while sharing common hardware and/or messaging resources.

As noted herein above, a communication channel may be provided by a particular entity (e.g., a carrier) that offers services, software or hardware (or a combination thereof) through which messages may be sent to recipient devices. (e.g., organizations different from communication services platform 120). In some implementations, the communication services offered by communication channels 114A-114Z may be integrated into communication services platform 120. In some implementations, the communication services offered by communication channels 114A-114Z may include messaging services. In some implementations, messaging services may include one or more of a short messaging service (SMS) offered by an SMS channel, a multimedia messaging service (MMS) offered by an MMS channel, or an instant messaging service (e.g., chat messaging) offered by an instant messaging service channel. In some implementations, the communication channels 114A-114Z may include one or more electronic mail channels.

Although implementations of the disclosure are discussed in terms of SaaS communication service platforms, implementations may also be generally applied to other types of platform, system or service.

In situations in which the systems discussed here collect personal information about users, or may make use of personal information, the users may be provided with an opportunity to control whether the communication services platform 120 collects user information, or to control whether and/or how to receive content from the communication services platform 120 that may be more relevant to the user. In addition, certain data may be treated in one or more ways before it is stored or used, so that personally identifiable information is removed. For example, a user's identity may be treated so that no personally identifiable information may be determined for the user, or a user's geographic location may be generalized where location information is obtained (such as to a city, ZIP code, or state level), so that a particular location of a user cannot be determined. Thus, the user may have control over how information is collected about the user and used by the communication services platform 120.

Elements of FIG. 1 are used with respect to FIGS. 2-5 to help describe various aspects and features of the communication services platform 120. As noted herein above, the communication services platform 120 may provide a desired distribution of the available messaging resources (e.g., messaging bandwidth) associated with a given destination (e.g., a destination network defined by the MCC and MNC) and/or sender (identified by the origin endpoint identifier, such as a sender phone number used for outgoing SMS messages or a sender account identifier user for other communication channels). In some implementations, the distribution of the available messaging resources is implemented by a message queuing module 151, which may maintain multiple message queues that facilitate a desired distribution of the available messaging resources (e.g., messaging bandwidth or messaging rate) at each of one or more hierarchical levels.

In some implementations, a messaging platform may generate a hierarchical data structure having respective levels corresponding to parent accounts and their respective sub-accounts, levels of service, carriers, and/or other entities or parameter values affecting the desired messaging resource distribution. At each level of the hierarchical data structure, a corresponding messaging resource distribution method (e.g., even distribution or weighted distribution) may be implemented, which may be independent of the messaging resource distribution methods implemented at other levels of the hierarchical data structure.

"Even distribution" (also referred to as "equal distribution" or "fair distribution") herein means that the messaging resource quotas allocated to any two nodes sharing a common parent node of the hierarchical data structure (e.g., sub-accounts of a given account) would differ by no more than a predefined value reflecting the permissible deviation from the absolute equal allocation. "Weighted distribution" herein means that the messaging resource quotas are allocated to each node of a group of nodes sharing a common parent node of the hierarchical data structure (e.g., sub-accounts of a given account) proportionally to respective weight values associated with the nodes.

In some implementations, certain entities and/or parameter values that define respective levels of the hierarchical data structure (e.g., the carrier or the level of service) may be grouped into multiple tiers (e.g., tier 1 carriers and tier 2 carriers; or tier 1, 2, and 3 levels of service), such that each tiered parameter or entity would be accounted for by two adjacent levels of the hierarchical data structure (e.g., tier 1 carriers with corresponding child nodes associated with specific carriers and tier 2 carriers with corresponding child nodes associated with specific carriers).

FIG. 2 schematically illustrates an example hierarchical data structure maintained by communication services platform for determining a desired distribution of messaging resources among multiple message queues, in accordance with aspects of the present disclosure. As schematically illustrated by FIG. 2, the messaging rate associated with a given sender type (e.g., toll-free phone number, short phone number, or long phone number) may be distributed based on the assigned weights at one or more hierarchical levels (e.g., corresponding to the parent account, the level of service, the carrier tier, the carrier, the sub-account tier, and the sub-account).

The root node 201 of the hierarchical data structure 200 may correspond to a specified destination (e.g., identified by the MCC and/or MNC). The child nodes 202A-202N of the root node 402 may correspond to respective sender types (e.g., toll-free phone number, short phone number, or long phone number). The child nodes 205A-205K of each sender type node 202A-202N may correspond to respective parent accounts of the messaging platform. The child nodes of each parent account node (e.g., the child nodes 210A-210L of the parent account node 205A) may correspond to respective levels of service supported by the messaging platform. The child nodes of each level of service node (e.g., the child nodes 220A-220B of the level of service node 210A) may correspond to respective carrier tiers utilized by the messaging platform. The child nodes of each carrier tier node (e.g., child nodes 230A-230B of the carrier tier node 220A) may correspond to respective carriers. The child nodes of each carrier node (e.g., child nodes 240A-240B of the carrier node 230A) may correspond to respective sub-account tiers. The child nodes of each sub-account node (e.g., the child nodes 250A-250C of the sub-account tier node 240A and the child nodes 250D-250E of the sub-account tier node 240B) may correspond to respective sub-accounts.

FIG. 3 is a flow diagram of an example method of dynamic allocation of messaging resources based on example hierarchical data structure of FIG. 2, in accordance with aspects of the present disclosure. The method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 300 is performed by the one or more modules (e.g., message queueing module 151) of the communication services platform 120 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations.

At operation 305, the processing logic implementing the method identifies the root node 201 of the hierarchical data structure 200 utilized for dynamic allocation of messaging resources. The root node 201 corresponds to a particular destination.

At operation 310, the processing logic implementing the method identifies a set of child nodes 202A-202N of the root node 201. Each child node corresponds to a respective sender type.

At operation 312, the processing logic allocates, to each sender type node 202A-202N, a respective share of the messaging resource quota (e.g., the messaging rate) associated with the destination represented by the root node 201. At each level of the hierarchical data structure 200, a chosen messaging resource distribution method (e.g., even distribution or weighted distribution) may be implemented, which may be independent of the messaging resource distribution methods implemented at other levels of the hierarchical data structure.

At operation 315, the processing logic identifies, for each sender type node 202A-202N, a corresponding set of child nodes 205A-205K. Each child node corresponds to a respective parent account.

At operation 320, the processing logic allocates, to each parent account node 205A-205K, a respective share of the messaging resource quota (e.g., the messaging rate) associated with the sender type represented by the root node 202.

At operation 325, the processing logic identifies, for each parent account node 205A-205K, a corresponding set of child nodes (e.g., the child nodes 210A-210L of the parent account node 205A). Each child node corresponds to a respective level of service.

At operation 330, the processing logic allocates, to each level of service node (e.g., nodes 210A-210L), a respective share of the messaging resource associated with the corresponding parent account node (e.g., parent account node 205A).

At operation 335, the processing logic identifies, for each level of service node (e.g., nodes 210A-210L), a corresponding set of child nodes (e.g., the child nodes 220A-220B of the level of service node 210A). Each child node corresponds to a respective carrier tier.

At operation 340, the processing logic allocates, to each carrier tier node (e.g., nodes 220A-220B), a respective share of the messaging resource associated with the corresponding level of service node (e.g., level of service node 210A).

At operation 345, the processing logic identifies, for each carrier tier node (e.g., nodes 220A-220L), a corresponding set of child nodes (e.g., the child nodes 230A-230B of the carrier tier node 220A). Each child node corresponds to a respective carrier.

At operation 350, the processing logic allocates, to each carrier node (e.g., nodes 230A-230B), a respective share of the messaging resource associated with the corresponding carrier tier node (e.g., carrier tier node 220A).

At operation 355, the processing logic identifies, for each carrier node (e.g., nodes 230A-230B), a corresponding set of child nodes (e.g., the child nodes 240A-240B of the carrier node 230A). Each child node corresponds to a respective messaging client tier (e.g., sub-account tier).

At operation 360, the processing logic allocates, to each sub-account tier node (e.g., nodes 240A-240B), a respective share of the messaging resource associated with the corresponding carrier node (e.g., carrier node 230A).

At operation 365, the processing logic identifies, for each sub-account tier node (e.g., nodes 240A-240B), a corresponding set of child nodes (e.g., the child nodes 250A-250C of the sub-account tier node 240A). Each child node corresponds to a respective set of one or more messaging clients (e.g., represented by a sub-account).

At operation 370, the processing logic allocates, to each sub-account node (e.g., nodes 250A-250C), a respective share of the messaging resource associated with the corresponding sub-account tier node (e.g., sub-account tier node 240A).

Figure 4:
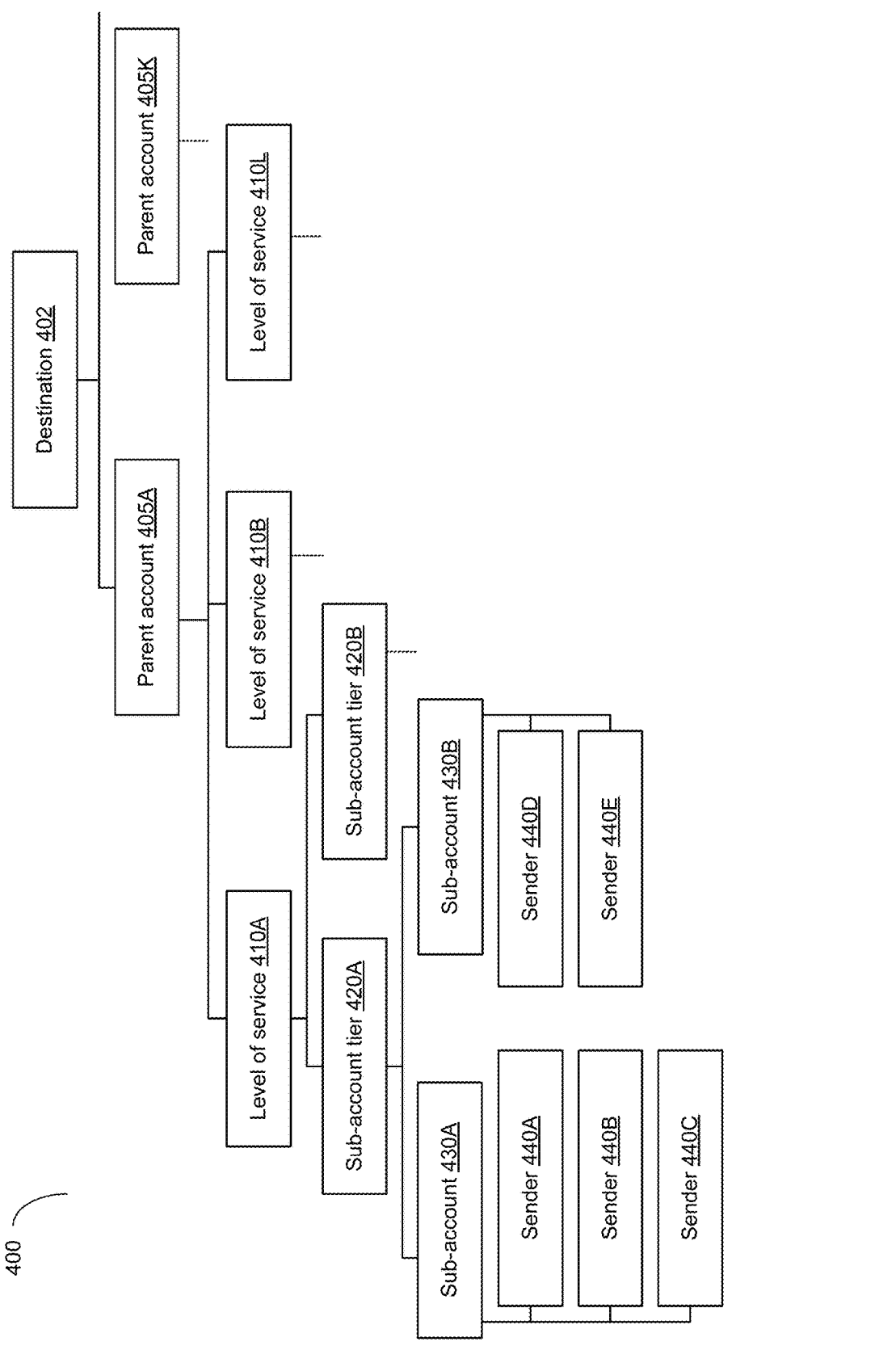
FIG. 4 schematically illustrates another example hierarchical data structure maintained by communication services platform for determining a desired distribution of messaging resources among multiple message queues, in accordance with aspects of the present disclosure.

FIG. 4 schematically illustrates another example hierarchical data structure maintained by communication services platform for determining a desired distribution of messaging resources among multiple message queues, in accordance with aspects of the present disclosure. As schematically illustrated by FIG. 4, the messaging rate associated with a given destination (e.g., identified by the MCC and/or MNC) may be distributed (e.g., evenly or based on the assigned weights) at each of one or more hierarchical levels (e.g., corresponding to the parent account, the level of service, the sub-account tier, the sub-account, and the sender).

The root node 404 of the hierarchical data structure 400 may correspond to a specified destination (e.g., identified by the MCC and/or MNC). The child nodes 405A-405K of the root node 402 may correspond to respective parent accounts of the messaging platform. The child nodes of each parent account node (e.g., the child nodes 410A-410L of the parent account node 405A) may correspond to respective levels of service supported by the messaging platform. The child nodes of each level of service node (e.g., the child nodes 420A-420B of the level of service node 410A) may correspond to respective messaging client tiers (e.g., sub-account tiers) utilized by the messaging platform. The child nodes of each sub-account tier node (e.g., child nodes 430A-430B of the sub-account tier node 420A) may correspond to respective groups of messaging clients (e.g., sub-accounts). The child nodes of each sub-account node (e.g., child nodes 440A-440C of the sub-account node 430A) may correspond to respective senders.

FIG. 5 is a flow diagram of an example method of dynamic allocation of messaging resources based on example hierarchical data structure of FIG. 4, in accordance with aspects of the present disclosure. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 500 is performed by the one or more modules (e.g., message queueing module 151) of the communication services platform 120 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations.

At operation 510, the processing logic implementing the method identifies the root node 402 of the hierarchical data structure 400 utilized for dynamic allocation of messaging resources. The root node 402 corresponds to a particular destination.

At operation 515, the processing logic identifies a set of child nodes 405A-405K of the root node 402. Each child node corresponds to a respective parent account.

At operation 520, the processing logic allocates, to each parent account node 405A-405K, a respective share of the messaging resource quota (e.g., the messaging rate) associated with the destination represented by the root node 402.

At each level of the hierarchical data structure 400, a chosen messaging resource distribution method (e.g., even distribution or weighted distribution) may be implemented, which may be independent of the messaging resource distribution methods implemented at other levels of the hierarchical data structure.

At operation 525, the processing logic identifies, for each parent account node 405A-405K, a corresponding set of child nodes (e.g., the child nodes 410A-410L of the parent account node 405A). Each child node corresponds to a respective level of service.

At operation 530, the processing logic allocates, to each level of service node (e.g., nodes 410A-410L), a respective share of the messaging resource associated with the corresponding parent account node (e.g., parent account node 405A).

At operation 535, the processing logic identifies, for each level of service node (e.g., nodes 410A-410L), a corresponding set of child nodes (e.g., the child nodes 420A-420B of the level of service node 410A). Each child node corresponds to a respective messaging client tier (e.g., sub-account tier).

At operation 540, the processing logic allocates, to each sub-account tier node (e.g., nodes 420A-420B), a respective share of the messaging resource associated with the corresponding level of service node (e.g., level of service node 410A).

At operation 545, the processing logic identifies, for each sub-account tier node (e.g., nodes 440A-440L), a corresponding set of child nodes (e.g., the child nodes 450A-450B of the sub-account tier node 420A). Each child node corresponds to a respective set of one or more messaging clients (e.g., represented by a sub-account).

At operation 550, the processing logic allocates, to each sub-account node (e.g., nodes 430A-430B), a respective share of the messaging resource associated with the corresponding sub-account tier node (e.g., sub-account tier node 420A).

At operation 555, the processing logic identifies, for each sub-account node (e.g., nodes 430A-430B), a corresponding set of child nodes (e.g., the child nodes 440A-440C of the sub-account node 450A). Each child node corresponds to a respective sender.

At operation 560, the processing logic allocates, to each sender node (e.g., nodes 440A-440C), a respective share of the messaging resource associated with the corresponding sub-account node (e.g., sub-account node 430A).

In other illustrative examples, various other hierarchical data structures may be employed by the messaging platform for distributing messaging resources among multiple users of a messaging platform.

In some implementations, the hierarchical data structure and/or allocated messaging resource quotas may be dynamically regenerated (e.g., periodically or in response to updating the distribution rules or in response to adding or removing one or more entities corresponding to respective nodes of the hierarchical data structures). In an illustrative example, a new sub-account may become associated with a parent account, which would result in creating a corresponding sub-account node under the parent account node of the hierarchical data structure and re-distributing the available messaging resource quota (e.g., messaging rate) between all sub-accounts of the parent account. In another illustrative example, a sub-account may leave the parent account, which would result in removing a corresponding sub-account node from the parent account node of the hierarchical data structure and re-distributing the available messaging resource quota between the remaining sub-accounts of the parent account. In another illustrative example, a new sender may become associated with a sub-account, which would result in creating a corresponding sender node under the sub-account node of the hierarchical data structure, creating a new queue associated with the sender, and re-distributing the available messaging resource quota (e.g., messaging rate) between all senders. In yet another illustrative example, a sender may be disassociated from a sub-account, which would result in removing a corresponding sender node under the sub-account account node of the hierarchical data structure, destroying a queue associated with the sender, and re-distributing the available messaging resource quota (e.g., messaging rate) between the remaining senders.

The messaging platform may maintain, for every terminal node (i.e., every node of the lowest level) of the hierarchical data structure, a corresponding message queue, which may be identified by the path from the root node to the terminal node associated with the message queue.

In some implementations, the message queues may be horizontally partitioned ("sharded") between two or more physical or virtual nodes of a cluster, in order to balance the workload across multiple nodes. Accordingly, each message queue may be distributed ("striped") across multiple partitions ("shards") residing on respective physical or virtual nodes of a cluster. Thus, each physical or virtual may implement all message queues for one or more destinations. Such horizontal sharding of the message queues allows linear scaling by adding nodes as the workload (e.g., incoming message rate) increases.

In some implementations, the communication services platform may expose one or more messaging API endpoints for receiving, from clients of the communication services platform, messages to be forwarded to their respective destinations. Responsive to receiving, a messaging API endpoint, a request to forward a message, the communication services platform may utilize the request parameters to identify a queue for enqueueing the message. In an illustrative example, the message queue may be identified by the combination of destination network identifier (e.g., MCC and MNC), the parent account identifier, the sub-account identifier, the sender identifier, and/or the level of service. In clustered implementations, the message queue may be chosen on any available shard (e.g., following a round robin pattern, randomly selecting a shard, selecting a shard exhibiting the least value of a chosen computing resource usage metric over a moving time window, or applying any other suitable load balancing technique). The messaging platform may then insert the message into the identified queue.

In some implementations, responsive to determining, that a value of a chosen performance metric associated with a particular message queue identified by the message queue identifier fails a predefined threshold criterion, the messaging platform may reject a subsequent message forwarding request with respect to that message queue. In an illustrative example, the performance metric may reflect (i.e., be represented by a mathematical function of) the period of time that a newly enqueued message is expected to stay in the queue before being forwarded to a carrier for handling. In an illustrative example, the performance metric may reflect (i.e., be represented by a mathematical function of) saturation of the respective messaging queue (e.g., the ratio of the vacant queue elements to the total number of queue elements). Accordingly, the predefined threshold criterion may specify the maximum period of time that a newly enqueued message is expected to stay in the queue.

Figure 6:
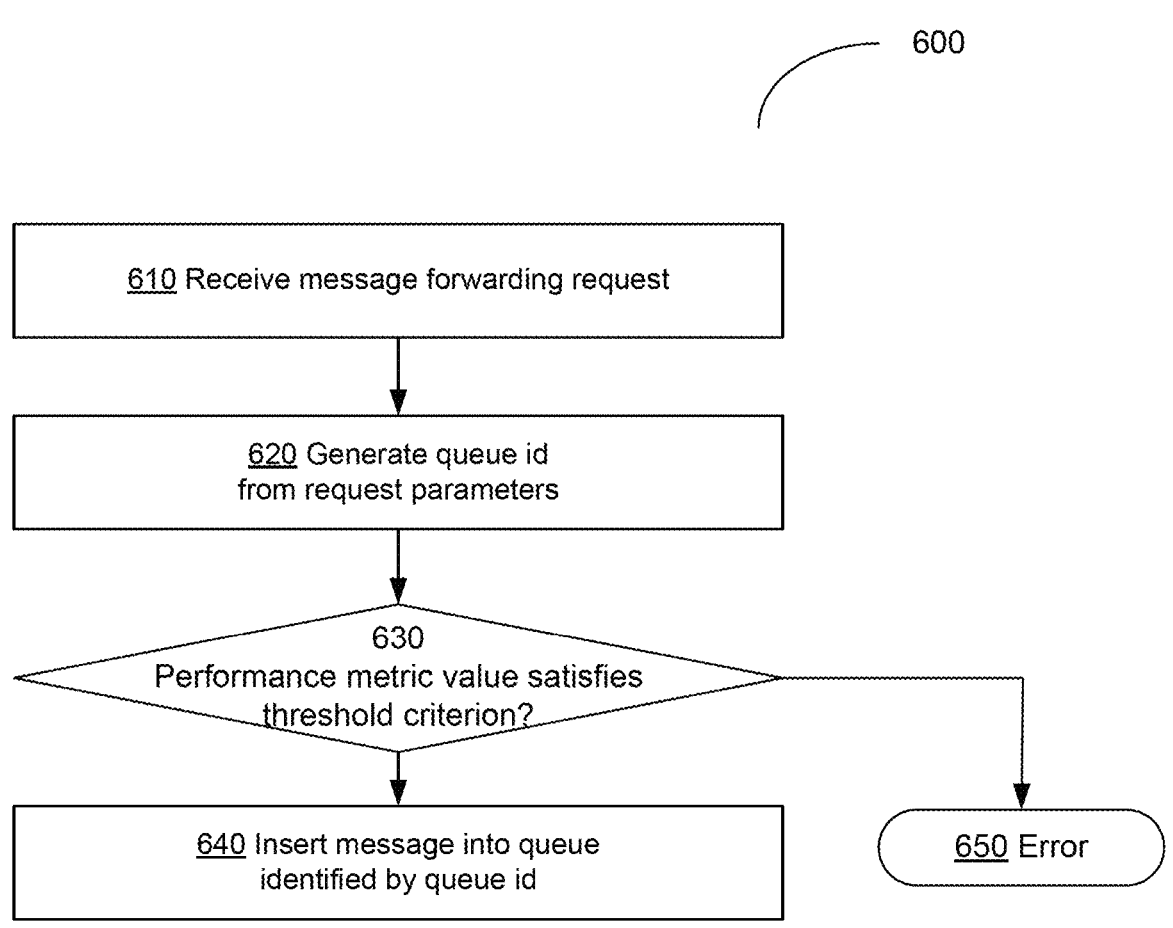
FIG. 6 is a flow diagram of an example method of enqueuing a message by a messaging platform operating in accordance with aspects of the present disclosure.

FIG. 6 is a flow diagram of an example method of enqueuing a message by a messaging platform operating in accordance with aspects of the present disclosure. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 600 is performed by the one or more modules (e.g., message queueing module 151) of the communication services platform 120 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations.

At operation 610, the processing logic implementing the method receives a request to forward a message to a specified destination.

At operation 620, the processing logic generates a queue identifier from the request parameters, e.g., the destination, the sender type, the sender, the originating sub-account and its parent account, and/or the level of service.

Responsive to determining, at operation 630, that a value of a chosen performance metric associated with the message queue identified by the message queue identifier satisfies a predefined threshold criterion, the processing logic, at operation 640, inserts the message in the identified message queue.

Conversely, responsive to determining, at operation 630, that the value of the chosen performance metric associated with the message queue identified by the message queue identifier fails the predefined threshold criterion, the processing logic, at operation 650, throws an exception and denies the message forwarding request.

The messages may be retrieved from the message queues and forwarded to the respective carriers by one or more message dequeuing processing threads, which may be scheduled asynchronously with respect to one or more message enqueuing processing threads. The message dequeuing processing threads may cyclically iterate through the queues. At every iteration, the message dequeuing processing threads may retrieve, from each queue of a group of queues associated with a respective group of nodes sharing a common parent node of the hierarchical data structure (e.g., sub-accounts of a given sub-account tier for a specified carrier, level of service, parent account and sender type), a respective number of messages that is proportional to its share of the messaging resource quota of the common parent node. The retrieved messages may be forwarded to respective carriers that would deliver the messages to their respective destinations.

Figure 7:
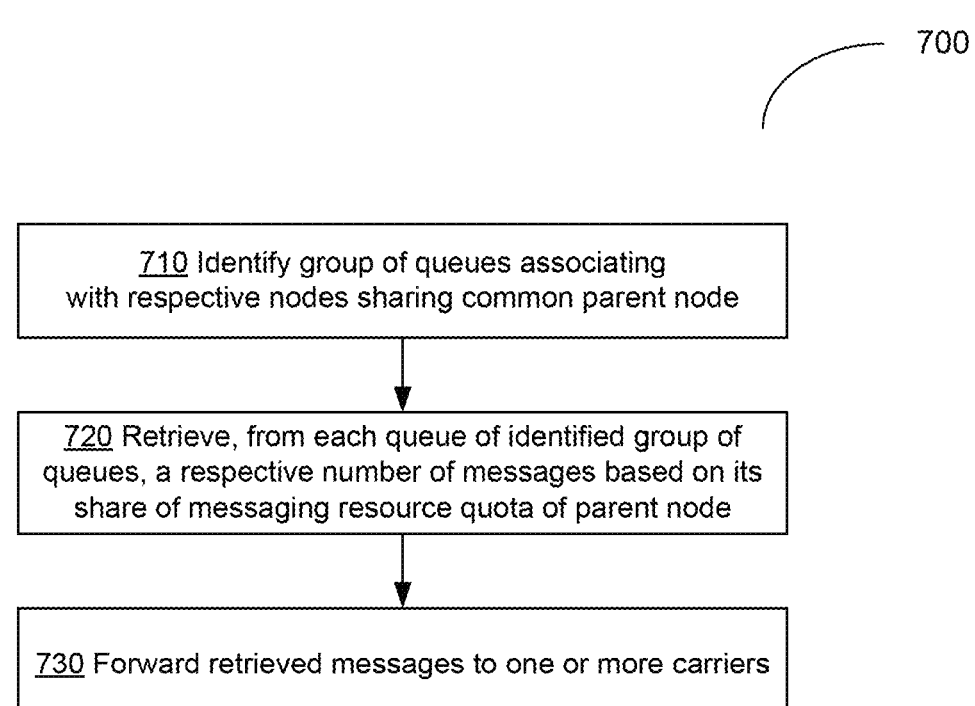
FIG. 7 is a flow diagram of an example method of dequeuing a message by a messaging platform operating in accordance with aspects of the present disclosure.

FIG. 7 is a flow diagram of an example method of dequeuing a message by a messaging platform operating in accordance with aspects of the present disclosure. The method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 700 is performed by the one or more modules (e.g., message queueing module 151) of the communication services platform 120 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations.

At operation 710, the processing logic implementing the method identifies a group of queues associated with a respective nodes sharing a common parent node of the hierarchical data structure (e.g., sub-accounts of a given sub-account tier for a specified carrier, level of service, parent account and sender type).

At operation 720, the processing logic retrieves, from each queue of the identified group of queues, a respective number of messages that is proportional to its share of the messaging resource quota of the common parent node of the hierarchical data structure.

At operation 730, the processing logic forwards the retrieved messages to one or more carriers for forwarding to their respective destinations.

Figure 8:
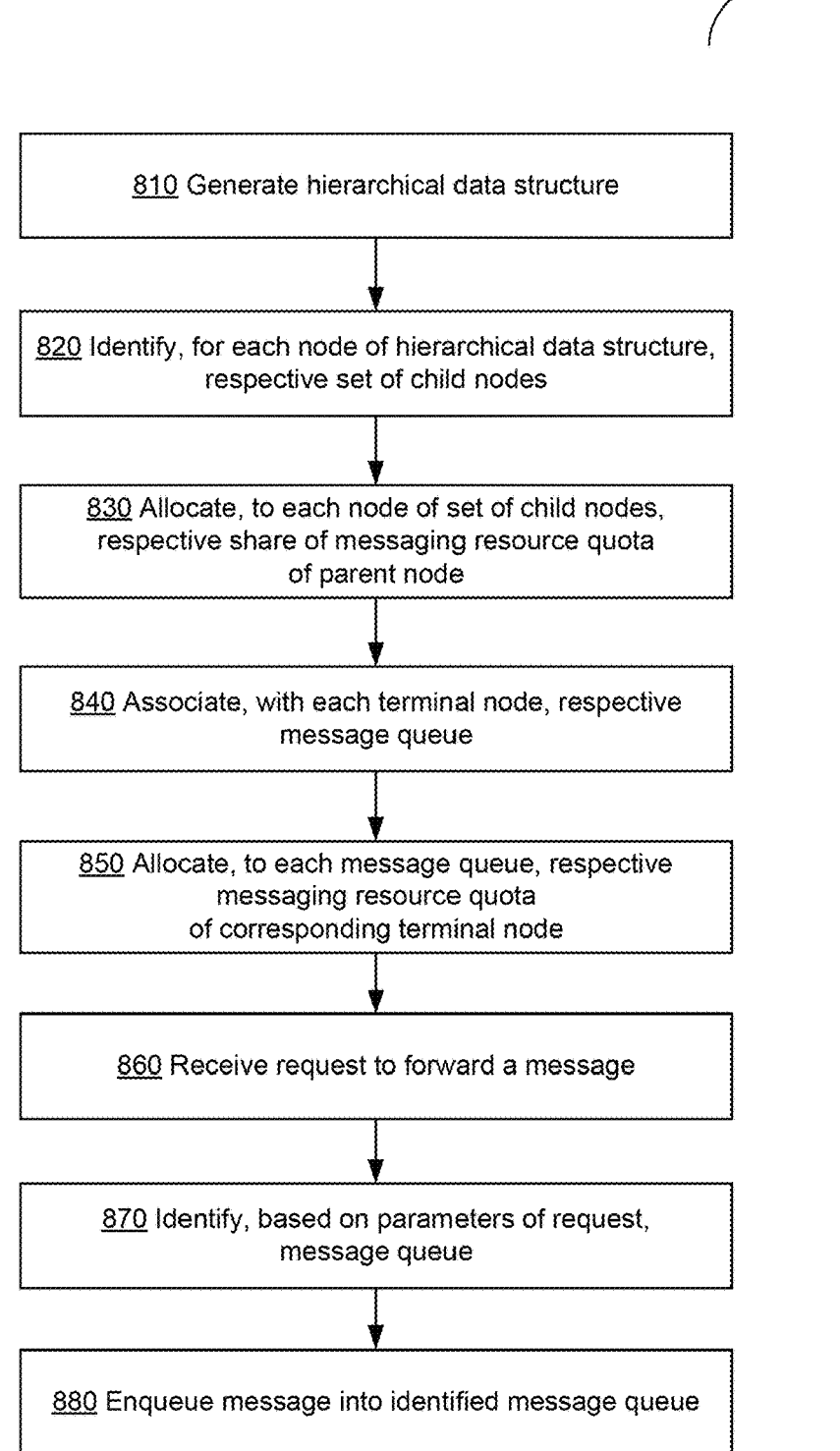
FIG. 8 is a flow diagram of an example method of dynamic allocation of messaging resources in a software as a service (SaaS) platform, in accordance with aspects of the present disclosure.

FIG. 8 is a flow diagram of an example method of dynamic allocation of messaging resources in a software as a service (SaaS) platform, in accordance with aspects of the present disclosure. The method 800 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some implementations, the method 800 is performed by the one or more modules (e.g., message queueing module 151) of the communication services platform 120 of FIG. 1. Although shown in a particular sequence or order, unless otherwise specified, the order of the operations may be modified. Thus, the illustrated implementations should be understood only as examples, and the illustrated operations may be performed in a different order, while some operations may be performed in parallel. Additionally, one or more operations may be omitted in some implementations.

At operation 810, the processing logic implementing the method generates a hierarchical data structure comprising multiple levels. In an illustrative example, one of levels may include a first set of nodes, such that each node of the first set of nodes is associated with a respective set of messaging clients (e.g., represented by a sub-account of a specified parent account) of the messaging platform, while another level of the plurality of levels may include a second set of nodes, such that each node of the second set of nodes is associated with a respective level of service supported by the messaging platform.

In another illustrative example, another level of the hierarchical data structure may include a third set of nodes, such that each node of the third set of nodes is associated with a respective carrier utilized by the messaging platform, while yet another level of the hierarchical data structure may include a fourth set of nodes, such that each node of the fourth set of nodes is associated with a respective carrier tier.

In another illustrative example, another level of the hierarchical data structure may include a fifth set of nodes, such that each node of the fifth set of nodes is associated with a respective sender utilized by the messaging platform.

In some implementations, the messaging resource quota is represented by a messaging rate, as described in more details herein above.

At operations 820-840, the processing logic traverses the hierarchical data structure. In particular, at operation 820, the processing logic identifies, for each node of the hierarchical data structure, a respective set of child nodes, as described in more details herein above.

At operation 830, the processing logic allocates, to each node of the set of child nodes, a respective share of a messaging resource quota associated with its parent node. In an illustrative example, the processing logic may implement even allocation or weighted allocation at each level of the hierarchical data structure, as described in more details herein above.

At operation 840, the processing logic associates a respective message queue with each terminal node of the hierarchical data structure, as described in more details herein above.

At operation 850, the processing logic allocates, to each message queue, a respective messaging resource quota associated with a corresponding terminal node, as described in more details herein above.

At operation 860, the processing logic receives, from a user associated with a specified sub-account, a request to forward, to a specified destination, a message associated with a specified level of service, as described in more details herein above.

At operation 870, the processing logic identifies, among the plurality of message queues, a message queue associated with the specified level of service and the specified sub-account, as described in more details herein above.

At operation 880, the processing logic queues the message into the identified message queue, as described in more details herein above.

Figure 9:
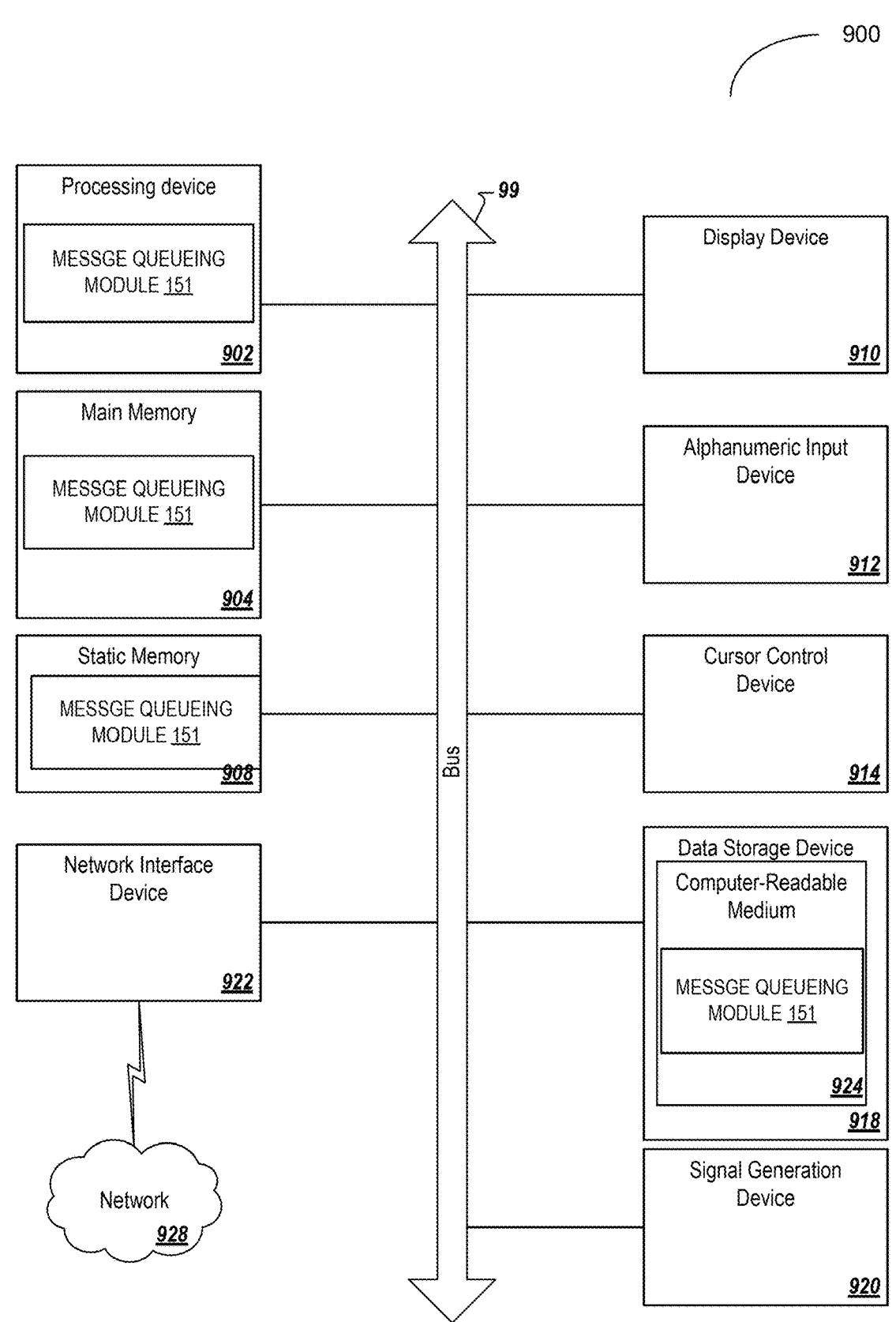
FIG. 9 is a block diagram illustrating an exemplary computer system, in accordance with some implementations of the disclosure.

FIG. 9 is a block diagram illustrating an exemplary computer system 900, in accordance with an implementation of the disclosure. The computer system 900 executes one or more sets of instructions that cause the machine to perform any one or more of the methodologies discussed herein. Set of instructions, instructions, and the like may refer to instructions that, when executed by computer system 900, cause computer system 900 to perform one or more operations of message queueing module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 908 (e.g., flash memory, static random access memory (SRAM), etc.), and a data storage device 918, which communicate with each other via a bus 908.

The processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions of the system architecture 100 and message queueing module 151 for performing the operations discussed herein.

The computer system 900 may further include a network interface device 922 that provides communication with other machines over a network 928, such as a local area network (LAN), an intranet, an extranet, or the Internet. The computer system 900 also may include a display device 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a non-transitory computer-readable storage medium 924 on which is stored the sets of instructions of the system architecture 100 of message queueing module 151 embodying any one or more of the methodologies or functions described herein. The sets of instructions of the system architecture 100 and of message queueing module 151 may also reside, completely or at least partially, within the main memory 904 and/or within the processing device 902 during execution thereof by the computer system 900, the main memory 904 and the processing device 902 also constituting computer-readable storage media. The sets of instructions may further be transmitted or received over the network 918 via the network interface device 922.

While the example of the computer-readable storage medium 624 is shown as a single medium, the term "computer-readable storage medium" may include a single medium or multiple media (e.g., a centralized or distributed database, and/or associated caches and servers) that store the sets of instructions. The term "computer-readable storage medium" may include any medium that is capable of storing, encoding or carrying a set of instructions for execution by the machine and that causes the machine to perform any one or more of the methodologies of the disclosure. The term "computer-readable storage medium" may include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure may occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional implementations, one or more processing devices for performing the operations of the above described implementations are disclosed. Additionally, in implementations of the disclosure, a non-transitory computer-readable storage medium stores instructions for performing the operations of the described implementations. Also in other implementations, systems for performing the operations of the described implementations are also disclosed.

It is to be understood that the above description is intended to be illustrative, and not restrictive. Other implementations will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:

generating, by a processing device of a messaging platform, a hierarchical data structure comprising a plurality of levels, wherein a first level of the plurality of levels comprises a first plurality of nodes, each node of the first plurality of nodes associated with a respective set of one or more messaging clients, wherein a second level of the plurality of levels comprises a second plurality of nodes, each node of the second plurality of nodes associated with a respective level of service supported by the messaging platform, and wherein a third level of the plurality of levels comprises a third plurality of nodes, each node of the third plurality of nodes associated with a respective destination;

traversing the hierarchical data structure, by identifying, for each node of the hierarchical data structure, a respective plurality of child nodes;

allocating, to each node of the plurality of child nodes, a respective share of a messaging resource quota associated with its parent node;

associating, with each terminal node of a plurality of terminal nodes of the hierarchical data structure, a respective message queue of a plurality of message queues;

allocating, to each message queue of the plurality of message queues, a respective messaging resource quota associated with a corresponding terminal node;

receiving, from a user associated with a specified set of messaging clients, a request to forward, to a specified destination, a message associated with a specified level of service;

identifying, among the plurality of message queues, a message queue associated with the specified level of service and the specified set of messaging clients; and queuing the message into the identified message queue.

2. The method of claim 1, wherein the messaging resource quota is represented by a messaging rate.

3. The method of claim 1, further comprising:

retrieving, from each message queue of the plurality of message queues, a respective number of messages based on a messaging resource quota associated with the message queue; and forwarding the retrieved messages to their respective destinations.

4. The method of claim 1, further comprising:

allocating, to each parent account of a plurality of parent accounts associated with the messaging platform, a respective account portion of the messaging resource quota associated with at least one of: a destination or a sender type.

5. The method of claim 1, wherein a fourth level of the plurality of levels comprises a fourth plurality of nodes, each node of the fourth plurality of nodes associated with a respective carrier utilized by the messaging platform.

6. The method of claim 5, wherein a fifth level of the plurality of levels comprises a fifth plurality of nodes, each node of the fifth plurality of nodes associated with a respective carrier tier.

7. The method of claim 1, wherein a fourth level of the plurality of levels comprises a fourth plurality of nodes, each node of the fourth plurality of nodes associated with a respective sender utilized by the messaging platform.

8. The method of claim 1, wherein allocating, to each node of the plurality of child nodes, a respective share of a messaging resource quota associated with its parent node is performed based on an even distribution of the messaging resource quota among the plurality of child nodes.

9. The method of claim 1, wherein allocating, to each node of the plurality of child nodes, a respective share of a messaging resource quota associated with its parent node is performed based on a weighted distribution of the messaging resource quota among the plurality of child nodes.

10. The method of claim 1, further comprising:

responsive to determining that a value of a performance metric associated with the identified queue fails a predefined threshold criterion, rejecting a subsequent message forwarding request originated by a user associated with the specified set of messaging clients.

11. A system, comprising:

a memory; and a processing device, coupled to the memory, the processing device configured to:

generate a hierarchical data structure comprising a plurality of levels, wherein a first level of the plurality of levels comprises a first plurality of nodes, each node of the first plurality of nodes associated with a respective sub-account of a specified parent account of a messaging platform, wherein a second level of the plurality of levels comprises a second plurality of nodes, each node of the second plurality of nodes associated with a respective level of service supported by the messaging platform, and wherein a third level of the plurality of levels comprises a third plurality of nodes, each node of the third plurality of nodes associated with a respective destination;

traverse the hierarchical data structure, by identifying, for each node of the hierarchical data structure, a respective plurality of child nodes;

allocate, to each node of the plurality of child nodes, a respective share of a messaging resource quota associated with its parent node;

associate, with each terminal node of a plurality of terminal nodes of the hierarchical data structure, a respective message queue of a plurality of message queues;

allocate, to each message queue of the plurality of message queues, a respective messaging resource quota associated with a corresponding terminal node;

receive, from a user associated with a specified sub-account, a request to forward, to a specified destination, a message associated with a specified level of service;

identify, among the plurality of message queues, a message queue associated with the specified level of service and the specified sub-account; and queue the message into the identified message queue.

12. The system of claim 11, wherein the messaging resource quota is represented by a messaging rate.

13. The system of claim 11, wherein the processing device is further configured to:

retrieve, from each message queue of the plurality of message queues, a respective number of messages based on a messaging resource quota associated with the message queue; and forward the retrieved messages to their respective destinations.

14. The system of claim 11, wherein allocating, to each node of the plurality of child nodes, a respective share of a messaging resource quota associated with its parent node is performed based on one of: an even distribution of the messaging resource quota among the plurality of child nodes or a weighted distribution of the messaging resource quota among the plurality of child nodes.

15. The system of claim 11, wherein the processing device is further configured to:

responsive to determining that a value of a performance metric associated with the identified queue fails a predefined threshold criterion, reject a subsequent message forwarding request originated by a user of the specified sub-account.

16. A non-transitory computer-readable storage medium comprising executable instructions that, responsive to execution by a processing device, cause the processing device to:

generate a hierarchical data structure comprising a plurality of levels, wherein a first level of the plurality of levels comprises a first plurality of nodes, each node of the first plurality of nodes associated with a respective sub-account of a specified parent account of a messaging platform, wherein a second level of the plurality of levels comprises a second plurality of nodes, each node of the second plurality of nodes associated with a respective level of service supported by the messaging platform, and wherein a third level of the plurality of levels comprises a third plurality of nodes, each node of the third plurality of nodes associated with a respective destination;

traverse the hierarchical data structure, by identifying, for each node of the hierarchical data structure, a respective plurality of child nodes;

allocate, to each node of the plurality of child nodes, a respective share of a messaging resource quota associated with its parent node;

associate, with each terminal node of a plurality of terminal nodes of the hierarchical data structure, a respective message queue of a plurality of message queues;

allocate, to each message queue of the plurality of message queues, a respective messaging resource quota associated with a corresponding terminal node;

receive, from a user associated with a specified sub-account, a request to forward, to a specified destination, a message associated with a specified level of service;

identify, among the plurality of message queues, a message queue associated with the specified level of service and the specified sub-account; and queue the message into the identified message queue.

17. The non-transitory computer-readable storage medium of claim 16, wherein the messaging resource quota is represented by a messaging rate.

18. The non-transitory computer-readable storage medium of claim 16, further comprising executable instructions that, responsive to execution by the processing device, cause the processing device to:

retrieve, from each message queue of the plurality of message queues, a respective number of messages based on a messaging resource quota associated with the message queue; and forward the retrieved messages to their respective destinations.

19. The non-transitory computer-readable storage medium of claim 16, wherein allocating, to each node of the plurality of child nodes, a respective share of a messaging resource quota associated with its parent node is performed based on one of: an even distribution of the messaging resource quota among the plurality of child nodes or a weighted distribution of the messaging resource quota among the plurality of child nodes.

20. The non-transitory computer-readable storage medium of claim 16, further comprising executable instructions that, responsive to execution by the processing device, cause the processing device to:

responsive to determining that a value of a performance metric associated with the identified queue fails a predefined threshold criterion, reject a subsequent message forwarding request originated by a user of the specified sub-account.

* * * * *